United States Patent
Lu et al.

(10) Patent No.: US 9,522,586 B2
(45) Date of Patent: Dec. 20, 2016

(54) ENHANCED ROAD CHARACTERIZATION FOR ADAPTIVE MODE DRIVE

(71) Applicant: Ford Global Technologies, LLC, Dearborn, MI (US)

(72) Inventors: Jianbo Lu, Northville, MI (US); Steven Joseph Szwabowski, Northville, MI (US); Kwaku O. Prakah-Asante, Commerce Township, MI (US); Fling Tseng, Ann Arbor, MI (US); Perry Robinson MacNeille, Lathrup Village, MI (US); Xiaoming Wang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/618,077

(22) Filed: Feb. 10, 2015

(65) Prior Publication Data
US 2016/0229252 A1  Aug. 11, 2016

(51) Int. Cl.
| | |
|---|---|
| *B60G 17/0165* | (2006.01) |
| *B60W 30/18* | (2012.01) |
| *B62D 6/00* | (2006.01) |

(52) U.S. Cl.
CPC .......... *B60G 17/0165* (2013.01); *B60W 30/18* (2013.01); *B62D 6/007* (2013.01)

(58) Field of Classification Search
CPC ..... B60G 17/0165; B60W 30/18; B62D 6/011
USPC ......................................................... 701/37
See application file for complete search history.

(56) References Cited

U.S. PATENT DOCUMENTS

| | | | |
|---|---|---|---|
| 5,410,477 A | 4/1995 | Ishii et al. | |
| 6,202,020 B1 * | 3/2001 | Kyrtsos | B60T 8/172 701/37 |
| 6,952,637 B2 | 10/2005 | Barron et al. | |
| 8,600,614 B2 | 12/2013 | Filev et al. | |
| 2010/0019964 A1 | 1/2010 | Huang et al. | |
| 2010/0152951 A1 | 6/2010 | Chin et al. | |

(Continued)

FOREIGN PATENT DOCUMENTS

| | | |
|---|---|---|
| CN | 203283230 U | 11/2013 |
| WO | 2013120546 A1 | 8/2013 |

*Primary Examiner* — Anne M Antonucci
(74) *Attorney, Agent, or Firm* — Frank A. MacKenzie; Brooks Kushman P.C.

(57) ABSTRACT

A vehicle selectively operates in a plurality of operational modes. The operational modes carry with them different commands for operating a controlled suspension system such as a continuously controlled damping suspension system, a controlled steering system such as an electronic power-assist steering system, and a powertrain of the vehicle. For example, in one operational mode, the powertrain might be more sensitive to output torque from a motor or engine quickly with little hesitation. The vehicle includes a sensing system, such as a plurality of suspension height sensors and a corresponding controller programmed to receive suspension height signals indicating the characteristic of the road, to categorize the signals, and to compute categorized vehicle characteristics such as vehicle pitch, heave, roll, yaw, etc. The controller can discretize the categorized signals into a discrete number of index values, and then command the vehicle to change operational mode based on the discrete index value.

18 Claims, 9 Drawing Sheets

(56) References Cited

U.S. PATENT DOCUMENTS

2012/0203424 A1\* 8/2012 Filev .................... B60W 50/00
701/36

\* cited by examiner

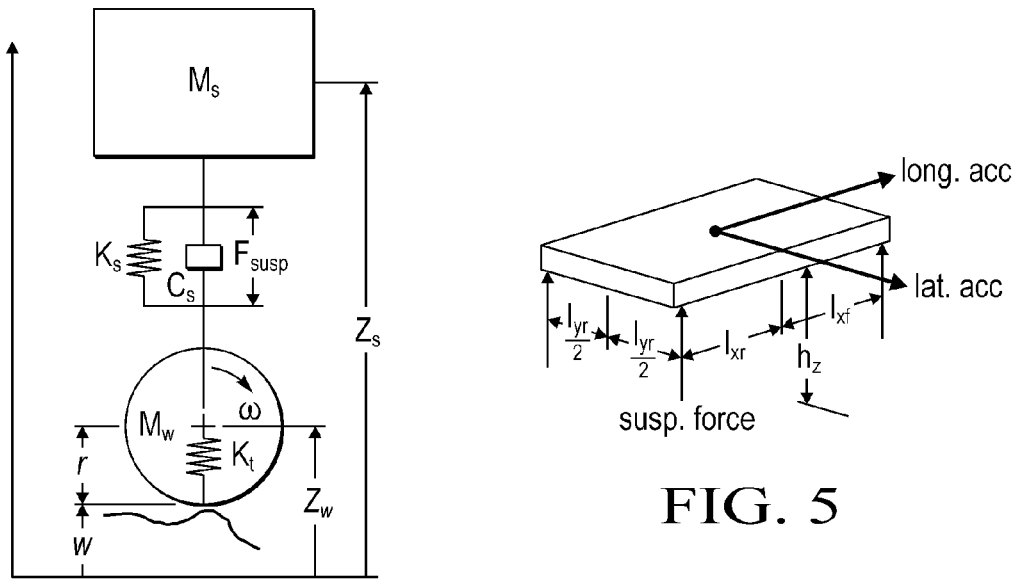
FIG. 4
FIG. 5
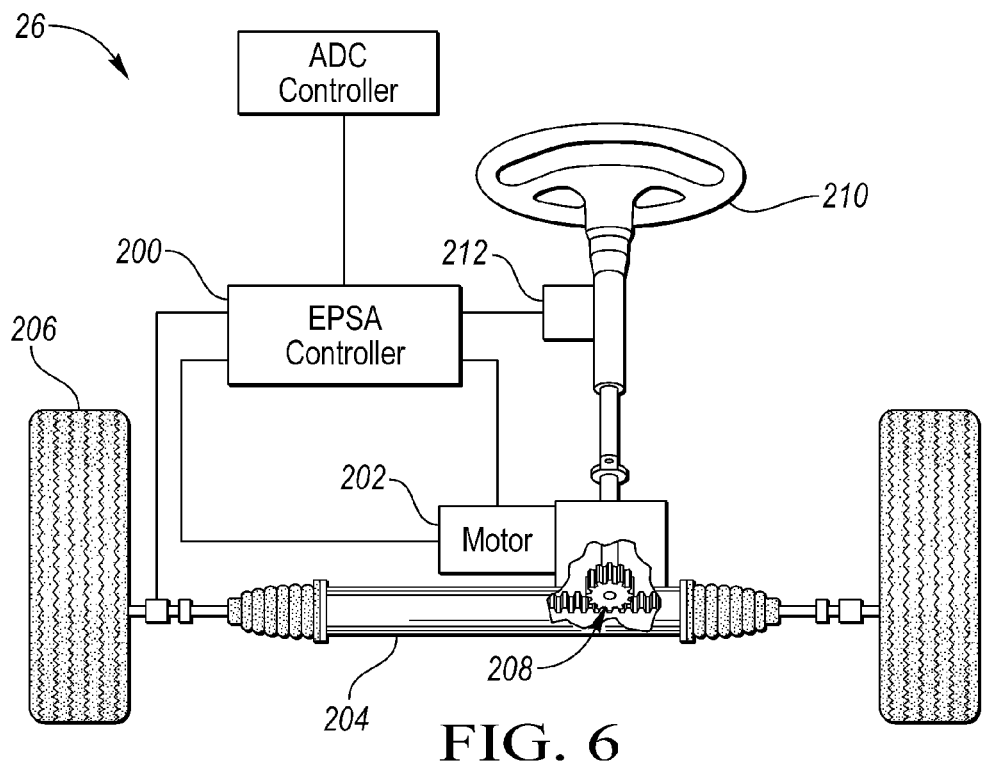
FIG. 6

ENHANCED ROAD CHARACTERIZATION FOR ADAPTIVE MODE DRIVE

TECHNICAL FIELD

The present disclosure relates to the automatic control of various subsystems within a vehicle. More specifically, the present disclosure relates to automatically changing an operational mode in the vehicle based on the external environment or driver selection, and altering the commands provided to the subsystems based on the change of operational mode.

BACKGROUND

Various vehicle subsystems are known to operate in different configuration modes to suit different conditions. For example, automatic transmissions can be controlled in "sport," "winter," "economy," and "manual" configuration modes in which the changes between gear ratios and other subsystem control parameters are modified to suit the driving conditions or the driver's preferences. Air suspensions are known with on-road and off-road configuration modes. Power steering systems can be operated in different configuration modes in which the level of assistance varies.

With the increasing number of control settings and computer instructions in vehicles, as well as the increasing number of controllable subsystems in vehicles, it may become more difficult for the driver to choose and select a proper configuration mode for the circumstances. It may therefore be desirable to have an integrated control strategy that automatically determines an appropriate setting for each vehicle subsystem.

SUMMARY

According to one embodiment, a control system of a vehicle includes an adaptive drive control module programmed to control vehicle subsystems according to various operational modes. A sensing system is configured to sense conditions associated with a road surface on which the vehicle travels. At least one controller is programmed to categorize the road surface conditions and alter the operational mode of the vehicle based on the categorized road surface conditions. The operational modes may include those used for controlled suspension systems such as continuously controlled damping (CCD) and controlled steering system such as electronic power steering or active front steering systems.

The categorized road surface conditions may include those that can excite vehicle body's motions on pitch, heave, and/or roll directions, and those that can excite the high frequency vibrations of the wheel-tire assemblies. The categorized signals from the sensing system can automatically cause the controller to change the operational mode of the vehicle.

The at least one controller can be further programmed to discretize the categorized road surface conditions and alter the operational mode based on the discretized categorized road surface conditions.

The sensed road surface conditions may be characterized with continuously varying variables that can be further discretized or categorized into discrete states with discrete values. Vertical variations in the road surface can be digitized into a time series for processing on a digital computer. These discrete values can be used to drive the decision making logic that changes the operational mode of the vehicle.

According to another embodiment, a control system of a vehicle comprises a controlled steering system such as an electronic power-steering control module programmed to control an electronic power-steering subsystem according to various operational modes. A sensing system is configured to sense road surface conditions associated with a road surface on which the vehicle travels. At least one controller is programmed to discretize the road surface conditions and alter the operational mode based on the discretized road surface conditions.

According to yet another embodiment, a vehicle comprises a powertrain control module programmed to (1) operate in a plurality of modes and (2) provide a powertrain with operational instructions that vary according to which mode the powertrain control module is operating in. A plurality of sensors are configured to sense road surface conditions associated with a road surface on which the vehicle travels. At least one controller is programmed categorize the road surface conditions and alter the operational mode based on the categorized road surface conditions.

According to yet another embodiment, a vehicle comprises a Continuously Controlled Damping module (CCD) programmed to provide different levels of damping according to various operational modes. A sensing system is configured to sense road surface conditions associated with a road surface on which the vehicle travels. At least one controller is programmed to discretize the road surface conditions and alter the operational mode based on the discretized road surface conditions.

The at least one controller can be further programmed to discretize the categorized the sensed road surface conditions and alter the operational mode based on the discretized categorized road surface conditions.

BRIEF DESCRIPTION OF THE DRAWINGS

FIG. 4 is a diagrammatic view showing the known features and mathematical relationships in one of the suspension units.

FIG. 5 is a diagrammatic view showing the displacement (relative to road surface) of the four corners of the vehicle body.

FIG. 6 is a schematic of an electronic power steering control system.

FIG. 8B illustrates a resulting indexed value for further computing and analysis as to which mode the vehicle should operate in.

FIGS. 12A-12C illustrate a comparison of the road curvature and curvature index from FIG. 11B, a resulting suspension index value and electronic power steering mode indexed value for arbitration into what mode the vehicle should be operating in.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
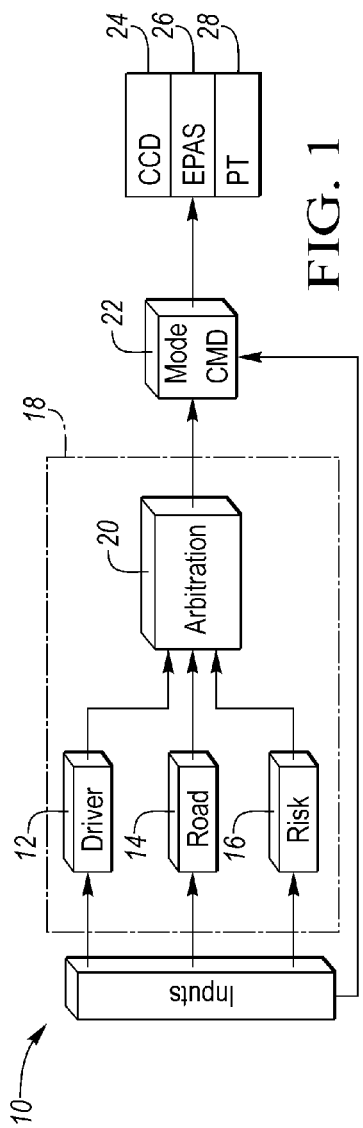
FIG. 1 is a signal flow chart illustrating the sequential flow of signals from the sensed road characteristics to the mode selection of the vehicle.

FIG. 1 illustrates an overall block diagram of an Adaptive Drive Control (ADC) system 10 that can control various subsystems within the vehicle. As will be described further below, the ADC can change the operational mode of the vehicle, thereby affecting the instructions and commands given to the various subsystems to deliver a desired operational function. For example, the ADC can change the vehicle from a "normal" mode to a "sport" mode, in which the power-steering may become more sensitive, the suspension may tighten, and other subsystems may change accordingly. "Sport," "normal," and "comfort" are three exemplary modes that can be automatically selected to adapt to conditions of road surface conditions and road geometry changes such as curve.

The ADC has three primary inputs—driver input 12 (e.g., driver manually selecting a drive mode), sensed road measurements 14, and risk factors 16 relating to the risk of changing operational modes during certain driving conditions. At least one processor or controller 18 then provides an arbitration function at 20 and, based on these three inputs, automatically determines via various algorithms which operational mode to enter at 22. Once the operational mode is entered, the instructions and controls given to the subsystems (e.g., Continuous Controlled Damper (CCD) or suspension system 24, Electronic Power-Steering Assist (EPAS) System 26, and Powertrain Control (PT) System 28) are alter to such that the driving characteristics alter accordingly.

Figure 2:
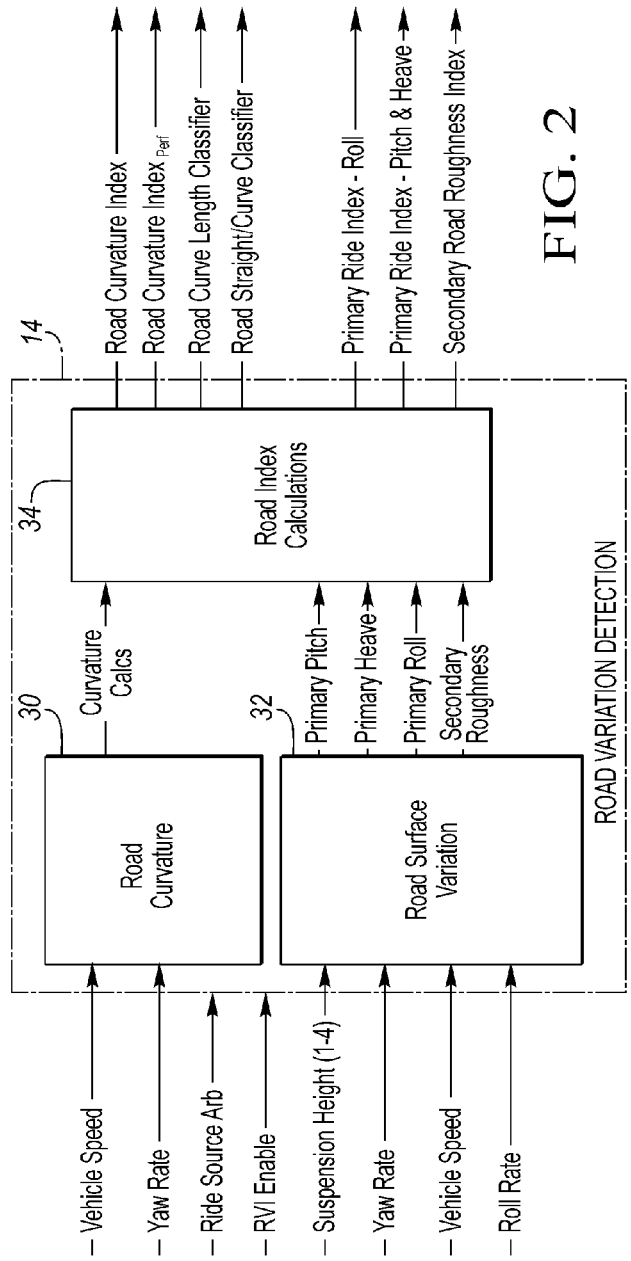
FIG. 2 is a detailed illustration of the inputs and outputs of the sensed road curvature and surface conditions, and the resulting road index calculations given to arbitrate the indexes and select a corresponding operational mode.

FIG. 2 illustrates a block diagram for the road condition sensing at 14. This can also be referred to as a road variation detection, as various inputs indicate the changes in the characteristics of the road. According to various aspects of the present disclosure, Road Variation Indexes (RVIs) are calculated based on the various road variation or condition detections.

As will be described below, the RVIs are formed from raw sensor measurements that are used for variable vehicle functions but can be mathematically but indirectly related to the characteristics of the road conditions, and classify the computations based on the raw sensor measurements to better capture whether the road is rough, smooth, curved, etc. These index values are ultimately available to the arbitration logic 20 for automatic mode selection. The arbitration logic 20 then commands the mode to either hold or change at 22 based on these index values. If the arbitration logic 20 commands the drive mode to change, the commands given to the various subsystems 24, 26, 28 change accordingly.

Figure 3:
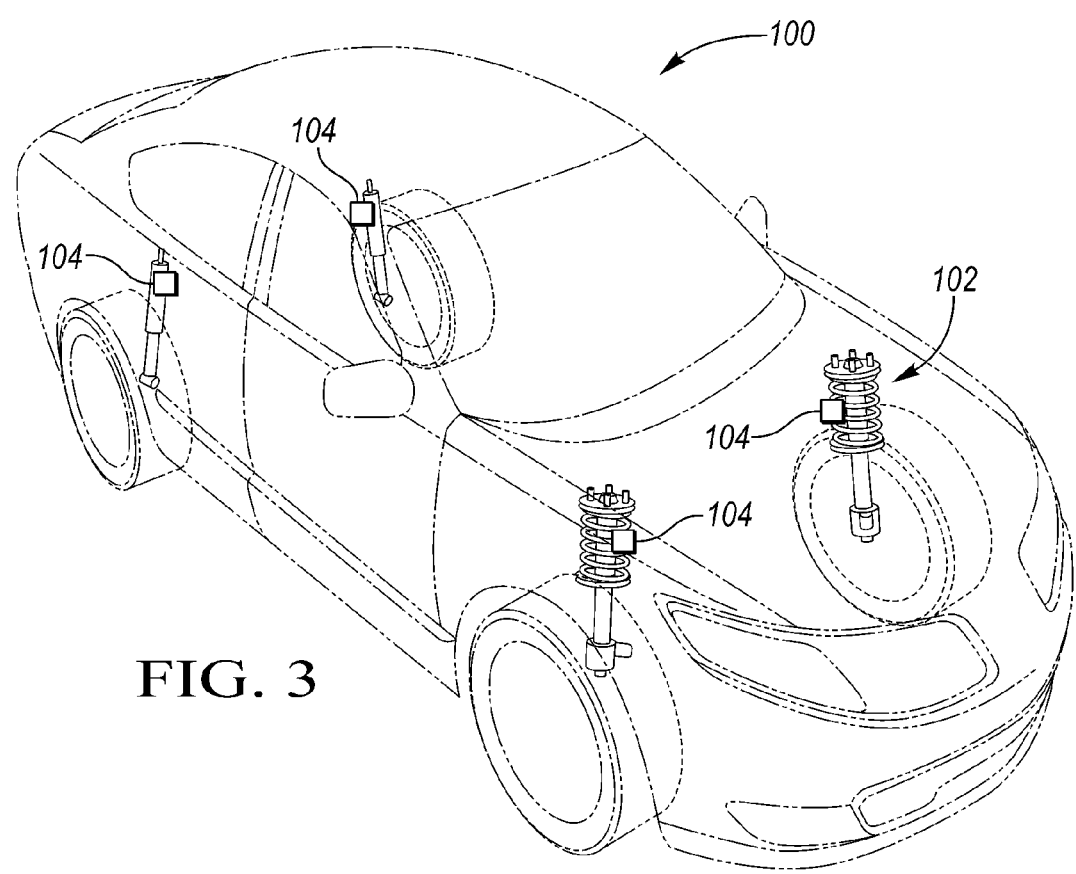
FIG. 3 is a perspective view of a suspension sensing system for sensing the height of the vehicle suspension units, thereby indicating the relative distance of the vehicle body from the road at each corner of the vehicle.

The raw sensor measurements for estimating road surface conditions can be determined via a suspension system, shown generally in FIG. 3, together with the on-board sensor measurements for the other control functions. The suspension system 100 includes a strut assembly and a shock absorber 102, such as a coil spring, located at each wheel. Suspension height sensors 104 are located along each strut assembly and are configured to indicate the relative displacement between the wheel center and the connecting point of the vehicle body. The Road Variation Indexes can then be calculated based on information derived from the four suspension height sensors, together with the other measurements and computed variables from the other sensor measurements.

For example, data from the suspension height sensors 104 can be used to calculate the vertical displacement of a wheel/tire corner using the car models shown in FIGS. 4-5. This can be used to characterize the vertical vibration or motion of the wheel/tire corner under the influence of road surface roughness or road surface variations or road conditions. The suspension height sensors 104 can also be used to compute the vehicle body motions in roll, pitch and yaw directions and their values with respect to the average plane of the road surface. See, for example, U.S. Pat. No. 6,684, 140, which is incorporated by reference herein. This patent illustrates one exemplary system for computing primary motion of the vehicle body under the influence of the road undulations or the driver's maneuvering, which is also illustrated in FIGS. 4-5. The sensors of the vehicle suspension together with the other measured and computed variables, for example, can be categorized to determine different categories of road surface conditions that excite vehicle body motions in pitch, roll, heave, and yaw directions.

FIG. 4 illustrates the value $F_{susp}$ that is the suspension height measure. The term $C_s$ represents the damping coefficient of the suspension system and is controlled electronically by the ADC to alter the suspension mode, i.e. sport, normal, luxury, etc. On some vehicles the spring coefficient $K_s$ may be controlled electronically and there may be other devices such as devices to that produce additional forces.

FIG. 4 is a one wheel model, referred to as a quarter model. Quarter models can be combined into half vehicle models for modeling roll/pitch and half vehicle models can be combined into whole vehicle models to model heave. These models are used to develop the control algorithms that provide the inputs for road index calculations (FIG. 1). Half and whole vehicle models have not been illustrated.

Referring back to FIG. 2 specifically, the Road Indexes are based on road curvature detections 30 and road surface variation detections 32 (as indicated by the suspension height sensors, for example). The resulting index values include road curvature indexes and road surface variation indexes, which are calculated at 34 and are further described below.

Regarding the road curvature detections 30, the road curvature variation index combines measurements of vehicle speed and vehicle yaw rate. The vehicle speed can be determined from wheel speed sensors together with the other measured and computed signals, and the yaw rate can be received from the Electronic Stability Control (ESC) system, as described above. Vehicle lateral acceleration can also be used. Calculations of the road curvature index values will be described further below with regard to FIGS. 12A-C.

Regarding the road surface variation detections 32, or road roughness detections, the road surface variation detection is broken into a primary road roughness detection and a secondary road roughness detection. The primary road roughness detections include those that excite the vehicle body motions through determining the pitch angle, heave, and roll angle of the vehicle body with respect to the average road surface, as explained with reference to FIG. 5 above or U.S. Pat. No. 6,684,140. Passing the magnitude of those computed variables through band-pass filters will provide variables that can be used to assemble certain indexes, referred to as Primary Ride Indexes. The conversion of primary road roughness detection into Primary Ride Indexes is explained below with reference to FIGS. 7-8.

Likewise, the secondary road roughness detection and determinations, and the conversion of these detections into Secondary Ride Indexes, is explained below with reference to FIGS. 9-10.

Before describing in detail the methods and control algorithms for computing the Road Variation Indexes, an exemplary control system affected by the RVIs is illustrated in FIG. 6. In particular, an exemplary Electronic Power-Steering Assist (EPAS) subsystem 26 is illustrated. The EPAS subsystem 26 includes its own EPAS controller 200 that is communicatively coupled to the ADC controller 18, as explained with reference to FIG. 1 above. The ADC controller 18 provides the EPAS controller 200 with instructions depending upon which mode of operation (e.g., sport, normal, comfort) the ADC determines to be appropriate. Based on these instructions, the EPAS controller 200 provides commands to a power-steering motor 202. The motor 202 is coupled to a steering linkage 204 and used to assist in the turning of a pair of wheels 206. The steering linkage 204 may include, for example, a rack and pinion coupling, generally shown at 208. The power-steering motor 202 is configured to provide torque into the steering system to turn the wheels 206 while the driver turns a steering wheel 210. For example, a steering wheel sensor 212 detects the position of the steering wheel 210 and sends a signal indicating this position to the EPAS controller 200. The EPAS controller 200 then uses this signal to control the motor 202 accordingly to assist turning of the wheels 206.

In one embodiment, the calculated RVIs are used to alter the mode of operation of the ADC controller 18 as the road conditions change. This in turn alters the instructions sent to the EPAS controller 200 such that the motor 202 is used to assist the turning of the wheels 206 in a different fashion. For example, if the RVIs indicate a change in mode of operation from "normal" to "sport," the instructions sent to the EPAS controller 200 alter accordingly, causing the motor 202 to correspondingly modify its relative output as the steering wheel 210 is turned.

Other such examples are contemplated by using the RVIs to control the Continuously Controlled Damper (CCD) 24 and the Powertrain Control System 28 as the mode of operation changes due to the indexed values of the RVIs. For example, the CCD System 24 may include a control module responsible for commanding a necessary amount damping according to various RVIs and operational mode commands. Furthermore, the Powertrain Control System 28 may include a control module(s) responsible for controlling an engine, one or more electric motors, a transmission, a torque converter, and other such mechanisms in a powertrain. A change in operational mode for the Powertrain Control System 28 may, for example, alter the shift schedule of the transmission or the delay or responsiveness in the torque output from the engine or electric motor.

Figure 7A:
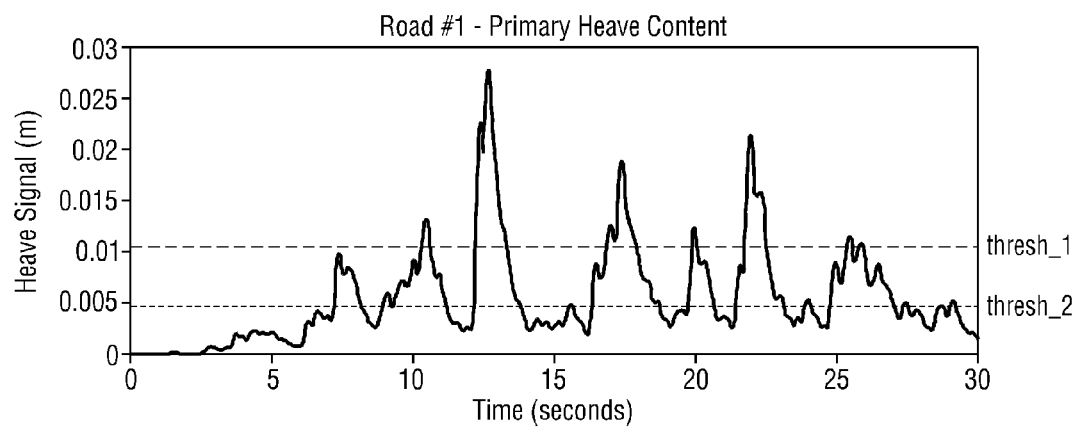
FIG. 7A illustrates a vehicle heave signal and FIG. 7B illustrates a resulting pitch-heave index.
Figure 7B:
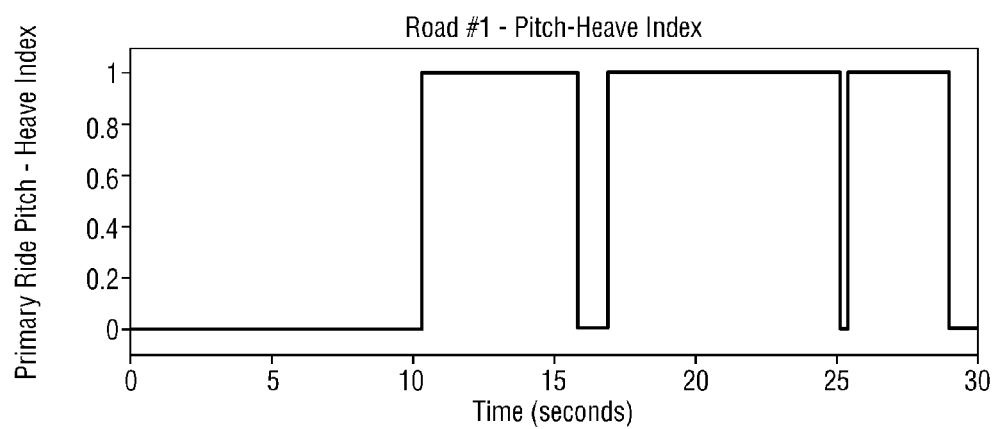

Referring to FIGS. 7A and 7B, illustrates an exemplary calculation of one of the primary RVIs—the pitch-heave index. In this particular example, FIG. 7A illustrates a computed vehicle body heave signal that is generated through band-passing the magnitude of the heave variable received from the suspension height sensors 104 across multiple wheels. This signal quantitatively indicates the heave motion of the vehicle body while traveling over a road surface. A similar signal can also be generated which indicates the pitch of the vehicle body, by comparing the suspension height measurements across multiple wheels.

Two thresholds are provided in FIG. 7A, namely, a first threshold (threshold_1) and a second threshold (threshold_2). These two thresholds are used to characterize the band-pass filtered magnitude of the computed vehicle body heave and pitch signals into a pitch-heave index. These thresholds are also tunable across vehicle platforms, and may also be tunable based on which driving mode the vehicle is currently operating in. In the example shown in FIG. 7A, the first threshold is about 0.01 m, as the second threshold is about 0.005 m.

The index value calculated in FIG. 7B is either 0 or 1. Additional integer index values may be given, as will be discussed below with regard to other embodiments. As the suspension height remains below the first threshold, e.g., between t=0 and t=10 seconds, the pitch-heave index remains 0. At about t=10 seconds, the suspension height exceeds the first threshold, also referred to as an activation threshold. Exceeding the activation threshold causes the pitch-heave RVI to change from 0 to 1, or "activate." The index value then remains at 1 until the suspension height signal falls below the second threshold. In the embodiment shown in FIGS. 7A-7B, the index value remains at 1 until the suspension height signal remains below the second threshold for a predetermined time (e.g., 2 seconds). This is analogous to a hysteresis being provided for the threshold, such that a transition delay from 1 to 0 is provided to account for ride input frequencies commonly observed when driving over a road surface. For example, as can be seen, the index value remains at 1 until about t=16 seconds due to the suspension height signal being below the second threshold from about t=14 seconds to t=16 seconds. Thereafter, the RVI index value increases back to 1 again at about t=17 seconds, due to the suspension height signal exceeding the first threshold again.

Figure 8A:
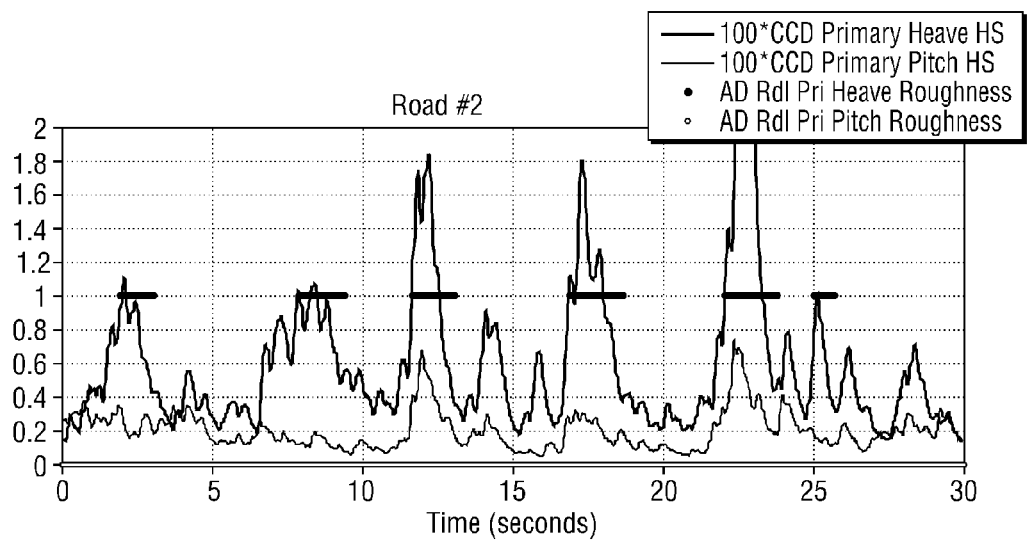
FIG. 8A illustrates pitch and heave signals indicating the roughness of the pitch and heave.
Figure 8B:
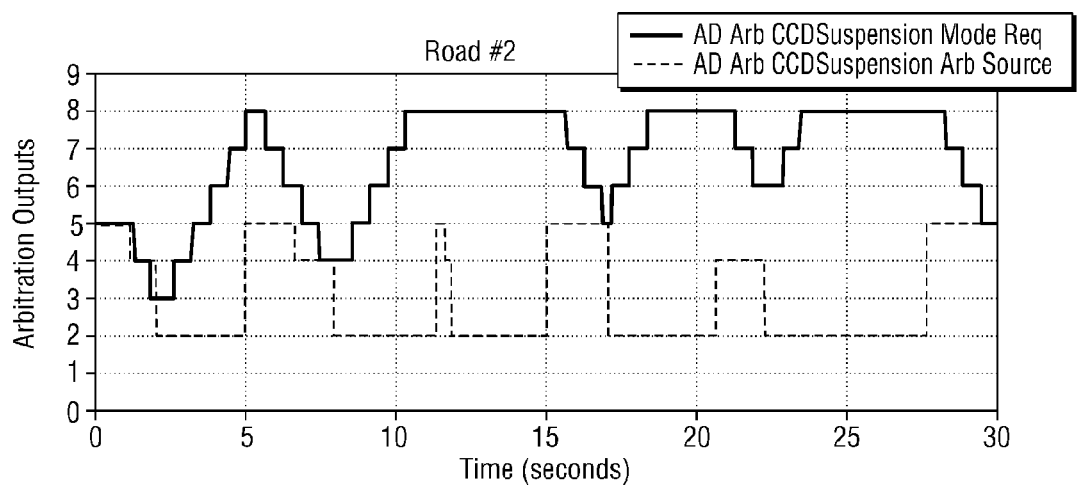

FIG. 8A represents primary heave and pitch signals, as detected from the suspension height sensors, after being passed through a band-pass filter, and resulting magnitudes of the signals that result in pitch and heave roughness. After these signals are sent through the arbitration function 20, the resulting discretized signals are illustrated in FIG. 8B. FIG. 8B is an output of the arbitration function 20 that leads the controller to determine which mode to enter at 22. For example, initially (e.g., between 0 and 1 second) the road is relatively smooth, keeping the mode request signal in FIG. 8B at a default level, e.g., Level 5. As the magnitude of the primary heave signal increases, the resulting suspension mode request changes incrementally from 5 to 4 to 3. The duration of the time the mode request is kept on each discrete level can be calibrated such that the rate of transition between steps is controlled. By moving between steps, the controller can determine which mode to enter based on which stepped level the suspension mode request signal is on.

In the embodiment illustrated in FIGS. 8A and 8B, as the rate of change of the magnitude of the heave of the vehicle fluctuates, the mode request fluctuates accordingly. For example, high amounts of road surface conditions cause the filtered pitch signals to abruptly spike around 12 seconds, 17 seconds and 22 seconds. At these times, the resulting suspension mode changes towards stepped level 8 and away from the default level 5. A resulting signal can be sent to indicate the automatic desire for the vehicle to enter a "Sport" mode rather than the default driving mode when the mode request is on stepped level 5.

The RVI determined in FIG. 7B is merely exemplary of one primary road index—the pitch-heave index. Another primary index value—a roll index—can be computed using suspension height signals and algorithms using such signals to indicate vehicular roll. The roll RVI is another primary road index value.

Figure 9A:
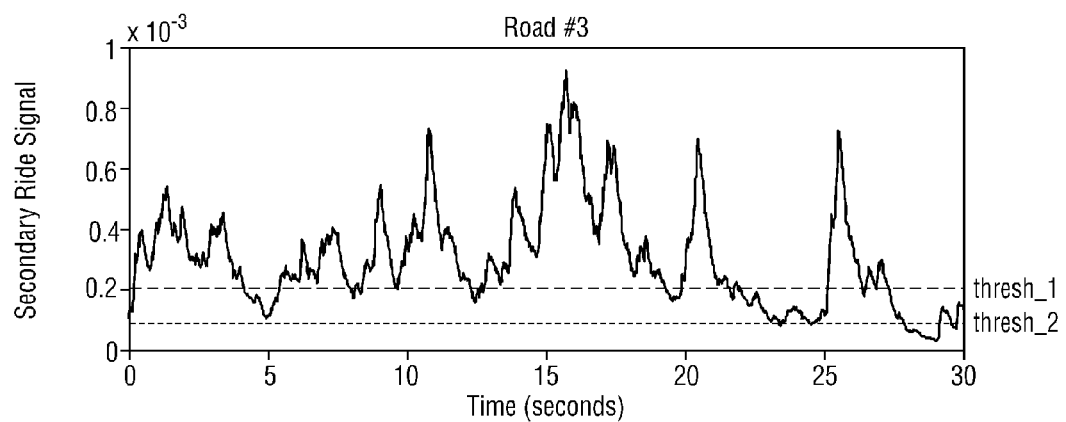
FIG. 9A illustrates a suspension height signal with two corresponding thresholds.
Figure 9B:
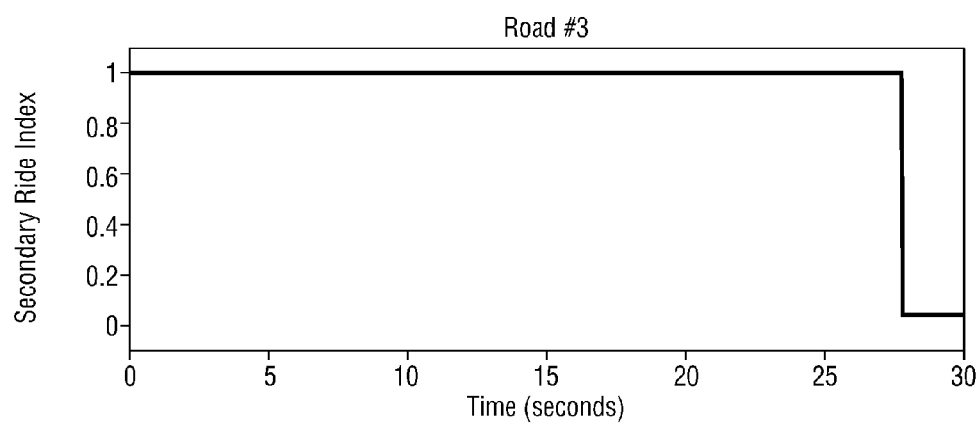
FIG. 9B illustrates the resulting secondary ride index values based on the comparison of the suspension height signal and the thresholds.

Secondary road index values are also computed, as explained above with regard to FIG. 2. The secondary ride index can also indicate road roughness. FIG. 9A shows a raw suspension height signal, and FIG. 9B shows a resulting secondary ride index value based on the suspension height. The secondary ride or roughness signal is calculated from a bandpass filtered magnitude of a signal determined by comparing the suspension height measurements across multiple wheels. Similar to FIGS. 7A-7B, two thresholds are again provided. As the suspension height (secondary ride or roughness signal) exceeds the first threshold (e.g., 0.2 m), the index value remains at 1, or remains "active." The index value does not change to 0 (or "deactivate") until the suspension height falls below the second threshold (e.g., 0.1 m). In this particular embodiment, the secondary ride index is not computed with a transition delay. In other words, as soon as the suspension height falls below the second threshold, the secondary ride index falls to 0 without first requiring that the suspension height remain below the second threshold for a certain time. In other practical uses, such as traveling over frost heaves, the transition delay can be provided.

Figure 10:
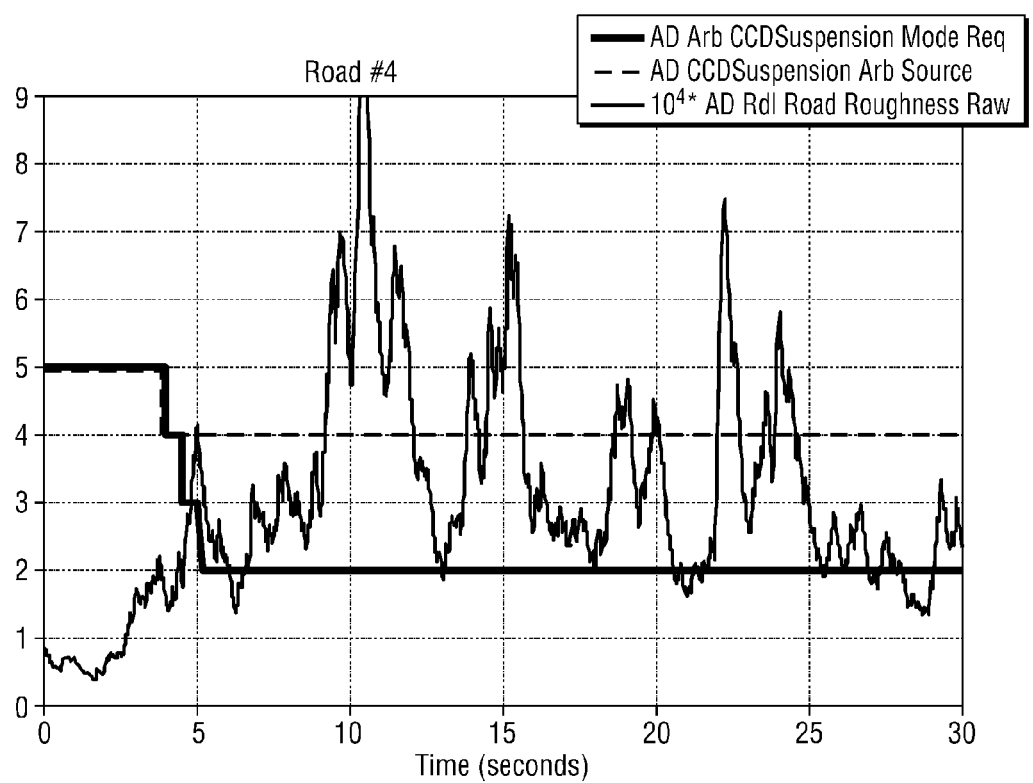
FIG. 10 illustrates a combined plot of the raw road roughness as determined from the suspension height sensors, a resulting secondary ride context signal, and a resulting suspension mode request signal.

FIG. 10 illustrates a combined plot of the raw secondary ride or road roughness signals as determined from the suspension height sensors, and the resulting secondary ride context signal going from stepped level 5 to 4 as well as the resulting suspension mode request signals decreasing from the default stepped level 5 to 2. Based on the particular characteristics of this traveled road, the output mode request may automatically change from the default driving mode to another driving mode based on the magnitude of the suspension height signals.

The RVIs calculated and used in FIGS. 7-10 are road surface variation indexes, shown in FIG. 2 as being calculated from road surface conditions 32. Also shown in FIG. 2 are signals relating to road curvature at 30 that can be calculated and transformed into a road curvature index at 34. FIGS. 11-12 disclose such road curvature index calculations.

Figure 11A:
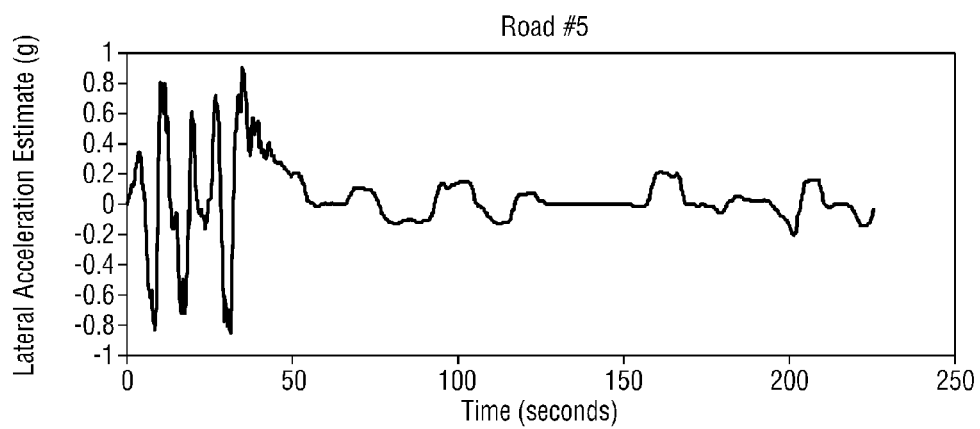
FIG. 11A illustrates a plot of lateral acceleration of the vehicle derived from a conversion of the data from the suspension height sensors.

In FIG. 11A, the road curvature is computed from an estimate of the vehicle lateral acceleration, described above. This particular computation ignores the sign of the signal (cornering direction), focuses on the pure magnitude (positive or negative) of the signal, and includes filtering. As the magnitude of the signal increases above the threshold and remains above the threshold for a certain time, the road curvature index is at 1 rather than the default 0.

Figure 11B:
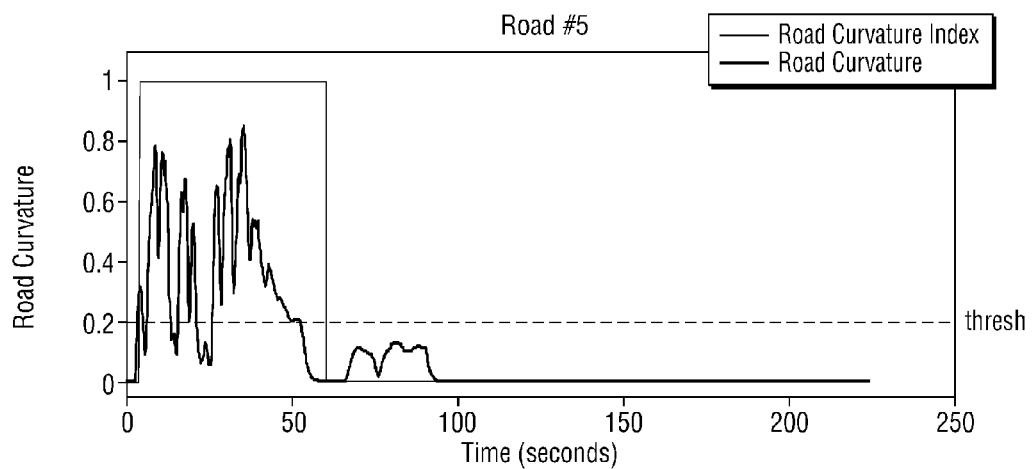
FIG. 11B illustrates a resulting road curvature signal and the resulting road curvature index.

The road curvature signal plotted in FIG. 11B is created by combining the vehicle yaw rate and the vehicle's speed. For example, if the vehicle retains a constant speed, a higher yaw rate will indicate a higher curvature. In this embodiment, only one threshold is shown. As the road curvature exceeds the threshold, a road curvature index is altered from 0 to 1. This RVI is not changed back to 0 unless and until the road curvature falls below the threshold for a predetermined amount of time.

It should be understood, as evident from the differences between the graphical representations in the present disclosure, that the use of thresholds can vary across different embodiments. One or multiple thresholds may be present, and the RVI can change between 0 and 1 (or a larger number of steps) accordingly as the road curvature or road surface variation signals exceed and fall below the one or two thresholds. Also, time delay or hysteresis may be provided in only some embodiments. For example, the embodiments in FIGS. 7A-7B include a time delay such that the suspension height signal must be below the second threshold for a certain time amount for the corresponding RVI to change from 1 to 0; such a time delay is not present in the embodiments in FIGS. 9A-9B.

Figure 12A:
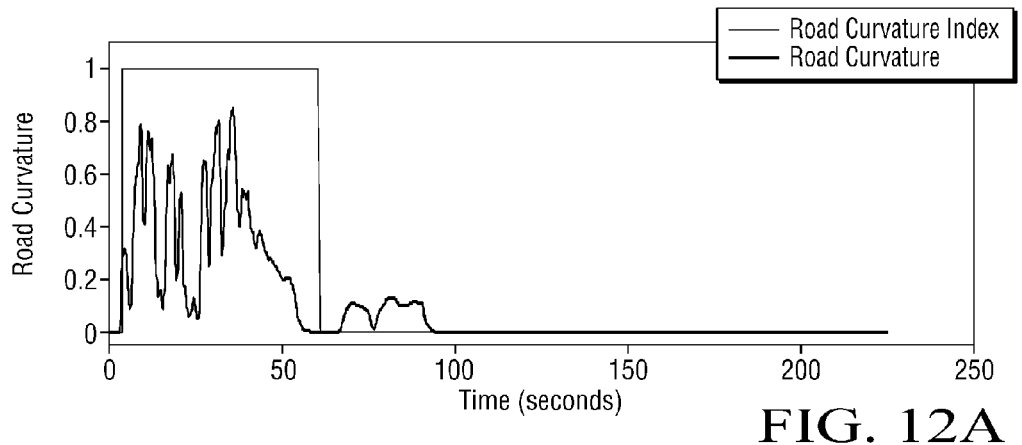
Figure 12B:
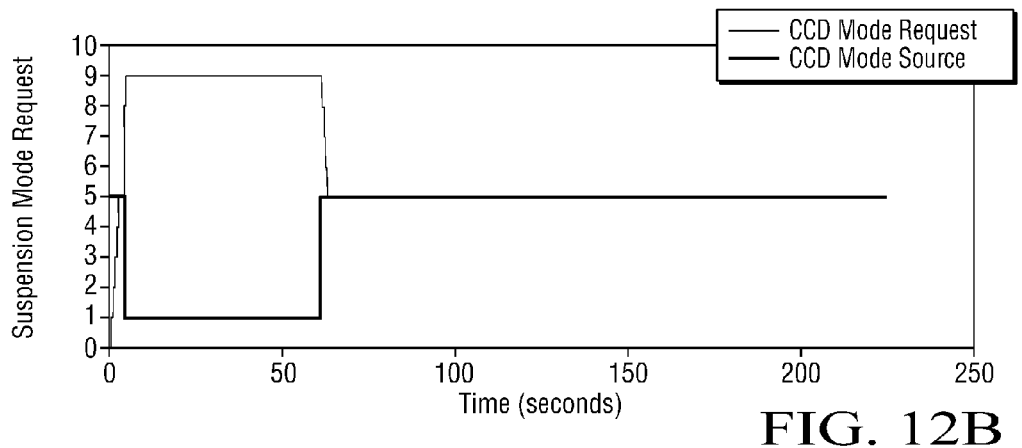
Figure 12C:
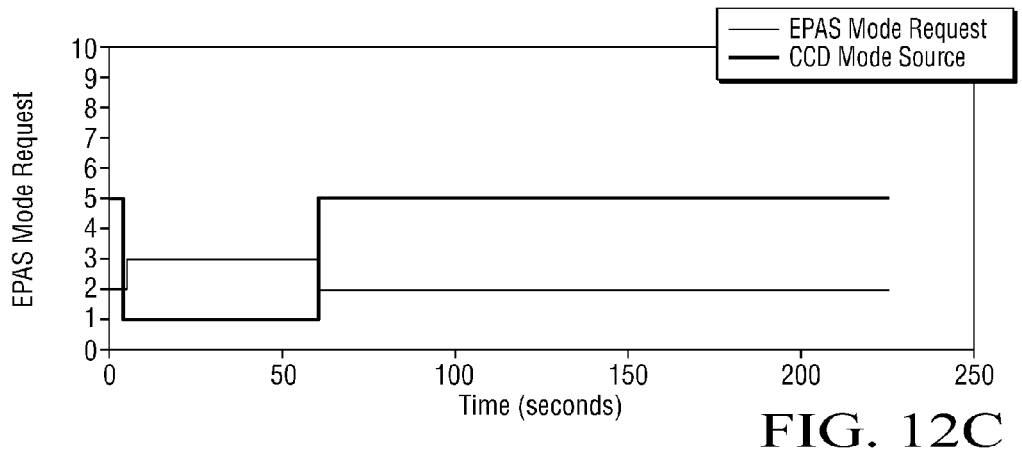

FIG. 12A is a reproduction of the road curvature signal and its associated road curvature index. FIGS. 12B and 12C illustrate the change in commands for the electronic power-steering assist system and the CCD system based on the road curvature changing.

Utilizing the teachings of the present disclosure, it is possible to characterize, index, discretize, or otherwise convert raw signals responsive to the driving conditions into certain RVIs that are in integer form. In other words, the road curvature signals or road surface variation signals can be converted into discrete values ("discretized"), such as two or more integers that represent Road Variation Indexes (RVIs). At least one processor then conducts an algorithm arbitration that takes into account each of the RVIs as the vehicle is driven. Based on the combinations and/or variations in the determined RVIs, the at least one processor can correspondingly alter the operational mode of the vehicle (e.g., "sport," "normal," "comfort," etc.) such that the commands given to the subsystem components (continuously controlled damping, power-steering, or powertrain components) change. In short, the system is configured to discretize or index road curvature and road surface signals, and alter the operational mode of a subsystem based on the discretized or indexed value.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A control system of a vehicle, comprising:
    an adaptive drive controller programmed to control a continuously controlled damping and spring subsystem according to an operational mode;
    a plurality of sensors configured to sense road surface conditions associated with a road surface on which the vehicle travels; and
    at least one controller programmed to alter the operational mode based on a discretization of the road surface conditions into more than two discrete values.

2. The control system of claim 1, wherein the at least one controller is further programmed to discretize the sensed road surface conditions into a first discrete value based on the sensed road surface conditions exceeding a first threshold.

3. The control system of claim 2, wherein the at least one controller is further programmed to discretize the sensed road surface conditions into a second discrete value based on the sensed road surface conditions being less than a second threshold.

4. The control system of claim 2, wherein the at least one controller is further programmed to discretize the sensed road surface conditions into a second discrete value based on the sensed road surface conditions being less than a second threshold for a predetermined amount of time.

5. The control system of claim 1, wherein the discretization includes indexed values indicating vehicle heave, pitch or roll.

6. The control system of claim 1, wherein the plurality of sensors includes a plurality of suspension height sensors each configured to sense the relative motions between the vehicle body and an associated involved wheel/tire assembly, and wherein signals generated by the suspension height sensors relate to the road surface conditions.

7. The control system of claim 1, wherein the plurality of sensors is further configured to sense road curvature associated with the road surface and wherein the at least one controller is further programmed to alter the operational mode based on a discretization of the sensed road curvature.

8. A control system of a vehicle, comprising:
    an electronic power-steering controller programmed to control an electronic power-steering subsystem according to an operational mode;
    a plurality of sensors configured to sense road surface conditions associated with a road surface on which the vehicle travels; and
    at least one controller programmed to alter the operational mode based on a discretization of the road surface conditions into more than two discrete values.

9. The control system of claim 8, wherein the plurality of sensors is further configured to sense road curvature associated with the road surface and wherein the at least one controller is further programmed to alter the operational mode based on a discretization of the sensed road curvature.

10. The control system of claim 8, wherein the at least one controller is further programmed to discretize the sensed road surface conditions into a first discrete value based on the sensed road surface conditions exceeding a first threshold.

11. The control system of claim 10, wherein the at least one controller is further programmed to discretize the sensed road surface conditions into a second discrete value based on the sensed road surface conditions being less than a second threshold.

12. The control system of claim 10, wherein the at least one controller is further programmed to discretize the sensed road surface conditions into a second discrete value based on the sensed road surface conditions being less than a second threshold for a predetermined amount of time.

13. A vehicle comprising:
    a powertrain controller programmed to operate in a plurality of modes and to provide a powertrain with operational instructions that vary according to which one of the modes the powertrain controller is operating in;
    a plurality of sensors configured to sense road surface conditions associated with a road surface on which the vehicle travels; and
    at least one controller programmed to alter the one of the modes the powertrain controller is operating in based on a discretization of the sensed road surface conditions into more than two discrete values.

14. The vehicle of claim 13, wherein the plurality of sensors includes a plurality of suspension height sensors each configured to sense the displacement of a corresponding wheel and wherein signals generated by the suspension height sensors relate to the road surface conditions.

15. The vehicle of claim 13, wherein the plurality of sensors is further configured to sense road curvature associated with the road surface.

16. The vehicle of claim 13, wherein the at least one controller is further programmed to discretize the sensed road surface conditions into a first discrete value based on the sensed road surface conditions exceeding a first threshold.

17. The vehicle of claim 16, wherein the at least one controller is further programmed to discretize the sensed road surface conditions into a second discrete value based on the sensed road surface conditions being less than a second threshold.

18. The vehicle of claim 16, wherein the at least one controller is further programmed to discretize the sensed road surface conditions into a second discrete value based on the sensed road surface conditions being less than a second threshold for a predetermined amount of time.

\* \* \* \* \*